(12) United States Patent
Maloney et al.

(10) Patent No.: US 10,785,104 B1
(45) Date of Patent: Sep. 22, 2020

(54) MECHANISM FOR AUTOMATIC RECONFIGURATION OF STATEFUL DEVICES

(71) Applicant: Accenture Global Solutions Limited, Dublin (IE)

(72) Inventors: Chris Maloney, Jamesburg, NJ (US); John Carl Anderson, Broadlands, VA (US); Scott Lee Stephenson, Broadlands, VA (US); Chase Alan Sylvester, Prosper, TX (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/666,758

(22) Filed: Oct. 29, 2019

Related U.S. Application Data

(60) Provisional application No. 62/878,972, filed on Jul. 26, 2019.

(51) Int. Cl.
*H04L 9/00* (2006.01)
*H04L 12/24* (2006.01)
*H04L 9/32* (2006.01)

(52) U.S. Cl.
CPC ........ *H04L 41/0816* (2013.01); *H04L 9/3213* (2013.01); *H04L 41/0859* (2013.01); *H04L 41/0879* (2013.01)

(58) Field of Classification Search
CPC ............ H04L 41/0816; H04L 41/0879; H04L 9/3213; H04L 41/0859
See application file for complete search history.

(56) References Cited

U.S. PATENT DOCUMENTS

| 8,601,115 | B2 | 12/2013 | Pope et al. | |
| 8,843,599 | B2 | 9/2014 | Pope et al. | |
| 2010/0180016 | A1* | 7/2010 | Bugwadia | H04W 24/02 709/220 |
| 2015/0289132 | A1* | 10/2015 | Zhang | H04L 41/08 726/2 |
| 2016/0182407 | A1* | 6/2016 | McCaughan | H04L 41/0668 370/219 |

* cited by examiner

*Primary Examiner* — Kim T Nguyen
(74) *Attorney, Agent, or Firm* — Brinks Gilson & Lione

(57) ABSTRACT

A mechanism automatically reconfigures and later restores the network configuration and settings for network devices installed at one location according to configuration and settings of corresponding network devices installed at another location. This enables a user to access these network devices the same way in both locations. This mechanism further avoids having to perform any network reconfiguration of mobile devices that may be carried between the two locations.

20 Claims, 8 Drawing Sheets

MECHANISM FOR AUTOMATIC RECONFIGURATION OF STATEFUL DEVICES

CROSS REFERENCE

This application claims priority to U.S. Provisional Application No. 62/878,972, filed with the U.S. Patent Office on Jul. 26, 2019, which is herein incorporated by reference in its entirety.

TECHNICAL FIELD

This disclosure relates to automatic configuration and reconfiguration of network routers/gateways and other network devices.

BACKGROUND

Network contents and resources may be accessed via a set of fixed network devices, including network routers/gateways and other managed network devices such as set-top boxes and content streaming devices. These network devices may be installed in various locations such as residences, hotels, and offices. These network devices may be configured to limit their accessibility to one or more authorized users associated with one account. These network devices may be further configured with personal network settings, network access preferences and credentials associated with the authorized users. The network devices installed at each location may be configured independently. A user (or a group of users) authorized to access a first set of network devices installed at a first location may travel to a second location equipped with a second set of network devices for a period of time. The user may desire to use temporarily the second set of network devices during the temporary period of time. The user will often be granted temporary guest access with limited or no ability to reconfigure the second set of network devices with personal settings of the first set of network devices, such that the user is not able to access network contents and resources via the second set of network devices in a same manner as used with the first set of network devices. While the second set of network devices may be manually reconfigured by an authorized user to provide custom settings for the guest user at the beginning of the temporary period, this requires a significant intervention between the authorized user and the guest user and sharing of private information to set up the temporary reconfiguration. It also requires manual restoration of the second set of network devices at the second location after the guest user departs. In addition, the guest user may carry other personal mobile or portable network devices such mobile phones, laptop computers, and wearable devices to the second location during the temporary period of time. These mobile or portable devices may be previously configured only with credentials to access the network router at the first location. The user may desire to access the network router at the second location from these mobile or portable devices. The user may further prefer accessing the network router or gateway from the mobile or portable devices without any modification of the settings in the personal mobile or portable devices. Accordingly, there are significant drawbacks in having to manually set up temporary configurations for temporary guest users, and restore the original configurations after the guest users depart.

DETAILED DESCRIPTION

Figure 1:
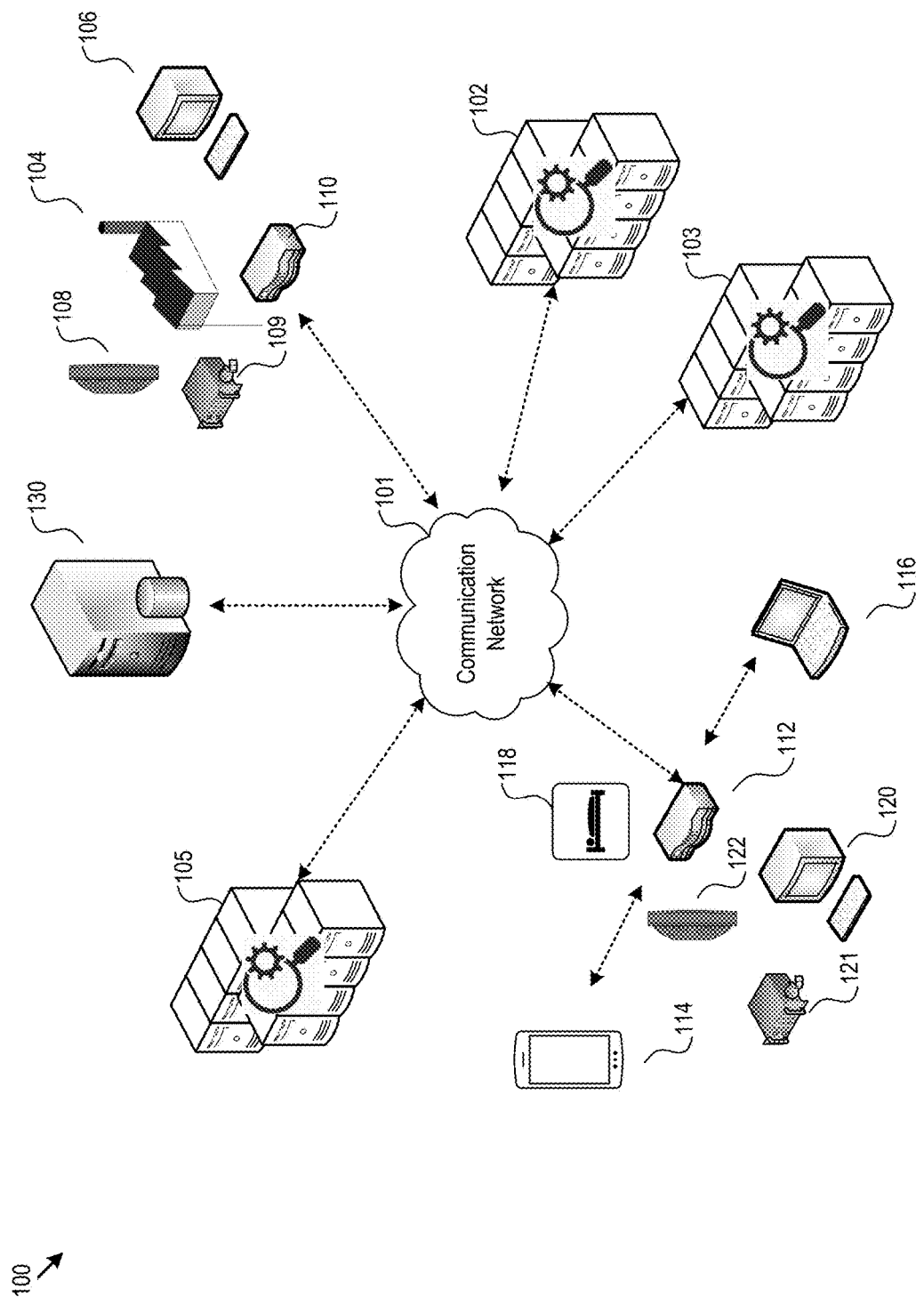
FIG. 1 shows an example of a system for automatic reconfiguration and restoration of network devices at different locations.

Remote network resources may be accessed from a set of network devices, including network routers/gateways and other network devices. These network devices may be installed in various locations to form, for example a wireless or wired local area network or personal area network. At each location, one or more network routers or gateways may be configured to provide entry points for the other network devices to access the remote network resources.

The network routers or gateways (collectively referred to as "gateways" for simplicity) of the local area networks may be configured to limit their accessibility to one or more authorized network devices. Specifically, each local area network may include one or more gateways configured to authenticate access by other network devices of the local area network using a network access credential. For example, a gateway may be configured with a network identification or network name and an access passcode. To be authenticated by the gateway, a network device may be supplied with the network identification and the access passcode of the gateway and configured to access the gateway by manual input of the network ID and access passcode of the gateway into the network device. The network identification and access passcode of the gateway may be stored in the network device after the initial configuration and no further manual input may be needed for subsequent access of the gateway by the network device. The various network devices may be connected to and authenticated by the gateways via wireless or wired connection channels. In some implementations, connection of network devices by physical wires (e.g., Ethernet cables) to the gateways may be considered as carrying an implicit authentication and thus no additional network access credential may be required.

Gateways in different local area networks may be configured independently. As such, the access credentials for different gateway are usually distinct. A network device supplied with an access credential of a gateway of one local area network may not be able to access another local area network. The network access credentials may be configured and modified by a user of the gateway. Besides access credentials, each gateway may be configured with other types of personal settings, such as parental control and other network access restrictions. These personal settings are likewise independent and distinct between different gateways.

The gateways may be supplied by a network carrier or service provider of remote network services beyond the local area network formed by the gateways and may thus be configured to be remotely provisioned or provisonable by the network carrier or service provider. As such, a gateway may be considered as a managed network device. For example, the settings within the gateway, including the network credential described above, may be accessed, modified, or reconfigured by the network carrier. The remote provisioning of the gateways by the network carrier may be provided via one or more provisioning communication channels. In one example, the gateways may be connected to the network carrier via RF or optical cables and the provisioning communication channel may be provided via the RF or optical cables.

The network carrier (and/or other service providers) may supply other managed network devices such as TV set-top boxes, content streaming devices, Voice-Over-IF (VOIP) phones, and video surveillance devices to the local area networks. These managed network devices may also be provisioned or provisionable by the network carrier via the provisioning communication channels. For example, these managed network devices may be provisioned via the RF or optical cables described above. While provisioning of these managed network devices may be achieved via the provisioning communication channels, these managed network devices may access remote data network via the gateways using the access credential of the gateways. These managed network devices may be further configured with personal settings within the local area network by users of the local area network rather than the service providers. For example, a managed digital TV set-top box may be configured with channel and content preferences and network browsing history and favorites of a user. For another example, a managed content streaming device may be configured with account access information (e.g., usernames and passwords) to access user accounts in remote streaming content servers. The gateway access credential and personal settings in these managed network devices may nevertheless be accessible, modifiable, reconfigurable, and restorable by remote provisioning via the provisioning communication channels.

Besides the managed network devices described above, there may also be other mobile and portable devices that can be connected to the gateway using the gateway access credential, including but not limited to mobile phones, laptop computers, game consoles, wearable devices, and the like.

A user (or a group of users) of a local area network at a home location may travel to a temporary location away from the home location. For example, in home or residence sharing, and in vacation rentals, the guest user may occupy a particular temporary residence away from home for a period of time. Like the home location, the temporary location may be equipped with various managed network devices and a gateway which acts as a hub for the managed network devices to form a local area network at the temporary location and an entry point for these managed network devices to connect to remote network resources. While a single gateway is described in the various implementations below, for purposes of illustration, a local area network may be supported by multiple distributed gateways. The managed network devices at the temporary location, may include but are not limited to TV set-top boxes, streaming devices, VOIP phones, and video surveillance devices. During the temporary time period while the guest user is away from their home location, the guest user may further bring his/her personal mobile or portable network devices to the temporary location. These mobile and portable devices may need to rely on the gateway at the temporary location to join the local area network at the temporary location and to gain access to remote network resources via either wired or wireless connection to the gateway.

The gateway of the local area network away from the home location may have been independently configured by the owner at the temporary location with a configuration (such as network ID, access credentials, and other network access settings) different for the configuration of the gateway installed at the home location of the guest user. The mobile and portable network devices of the guest user, however, may have been previously configured only with access credentials to the home gateway. In order to gain access to the gateway at the temporary location and without reconfigurations of the gateway, each of these mobile and portable network devices would need to be individually supplied and reconfigured with the network access credential of the gateway of the temporary location.

In the various implementations described in more detail below, rather than reconfiguring each individual mobile and portable devices, the gateway at the temporary location may be automatically reconfigured during the temporary traveling time period of the guest user with settings of the home gateway, including, for example, the network ID and passcode and other settings of the home gateway. As such, the mobile and portal devices can gain access to the gateway at the temporary location and join the local area network without modification or reconfiguration. As a further beneficial consequence of these implementations, there would be no need for the guest user to reconfigure the mobile and portable devices back to the home gateway access credential when the guest user returns to the home location following the temporary traveling time period.

The reconfiguration of the gateway at the temporary location may be triggered by the guest user and performed automatically, as illustrated in more detail below. Further, the configuration of the gateway at the temporary location may be automatically restored to its prior setting when the guest user does not need to access the gateway, e.g., at the end of the temporary time period, or when triggered by other events that terminate the stay of the guest user at the temporary location. The automatic reconfiguration and restoration of the gateway may be performed remotely via the provisional communication channels.

Once the gateway at the temporary location is automatically reconfigured with the home gateway settings, the other managed, devices (e.g., TV set top boxes, steaming devices, VOIP phones, and surveillance devices) may lose connection to the gateway if they are not also reconfigured, because the network access credentials previously stored in these network devices to access the gateway would not match the reconfigured access credential of the gateway. To keep the other managed network devices at the temporary location connected, in the various implementations described in more detail below, the other managed network devices may also be automatically reconfigured via, for example, the provisioning communication channel with the settings of the corresponding network devices of the guest user at the home location. As such, these other managed network devices, like the gateway, would not appear any different to the guest user from the home network devices and would have access to the reconfigured gateway at the temporary location. This is particularly the case for managed network devices where the managed network devices at the home location and the temporary location may be both supplied by the same service provider and may even be of the same model and have identical physical appearance. Further, like the gateway, these other managed network devices at the temporary location may be automatically restored to their prior settings when the guest user leaves at the end of the temporary time period or when triggered by other events that terminate the stay of the guest user at the temporary location. For unmanaged network devices (such as laptop computers, smart TVs, and the like) at the temporary location that lack direct access to the provisioning communication channels and that may be disconnected from the network after the automatic reconfiguration of the gateway, reconfiguration of their network credential to access the gateway may be performed by the guest user manually. In some alternative implementations, an intermediate device may be provided to connect from a standard I/O interface of the unmanaged device to the provisioning signal interface (such as an RF or optical cable, as described above). The network and or personal settings for these unmanaged network devices may be accessed and modified via the intermediate device and the provisioning communication channels, effectively turning these unmanaged network devices into managed network devices.

The automatic configuration of the gateway and the other managed network devices at the temporary location using home location settings not only enables access of the local area network at the temporary location by the guest user via both his/her mobile devices and the various managed network devices installed at the temporary location without any manual reconfiguration, but also inherits other personal settings of the guest user that are carried over from the home location.

For example, besides modifying the network ID and access passcode, the automatic reconfiguration of the gateway may further include updating other personal settings in the gateway such as parental control and other network access restrictions.

For another example, the guest user may have a managed streaming device installed at the home location that provides network contents through a network streaming service account subscribed with a streaming server. The temporary location may likewise be furnished with a managed streaming device. By automatic reconfiguration of the streaming device at the temporary location during the traveling time period of the guest user, not only the credentials for accessing the reconfigured gateways but also the network address of the content streaming server and the account information for accessing the user's content streaming service account stored in the home streaming device are transferred to the streaming device at the temporary location. The guest user may then access content from the remote streaming server at the temporary location as usual and without having to perform any manual configuration of the streaming device.

This implementations describe below provide exemplary mechanisms for automatic reconfiguration of the gateway and other managed network devices installed at the temporary location such that the user can access these network device the same way as he/she would access his/her home network devices. These automatic reconfiguration mechanisms further allows the guest user to avoid having to reconfigure his/her mobile devices for accessing the local area network at the temporary location. The examples below are given in the context of residence sharing, renting, or hoteling. The underlying principles are applicable to other use scenarios, including but not limited to office sharing, office hoteling, and corporate housing. While the term "temporary" is used for the location where the network devices are automatically reconfigured, such a location does not need to be temporary for the user. For example, the user may stay in a shared residence away from his/her home residence for an extended period of time. The term "home location" and "temporary location" are merely relative. For example, a "home location" may be occupied temporarily by other users and thus may also become a "temporary location". The terms "user," "guest user" and "renter" may be used interchangeably to provide clarity in these examples. In the implementations below, these locations may be generally referred to as "a first location" (or "location 1") and "a second location" (or "location 2"). Further, the term "network devices", when generally used, may refer to any of gateways, managed network devices, and mobile/portable devices. The reconfiguration and restoration of the gateway and the managed network devices may be provided via the provisioning communication channels.

FIG. 1 shows an example system 100 in which an automatic reconfiguration mechanism for various network devices is implemented. In FIG. 1, the system 100 may include various network devices such as unmanaged smart TV 108, managed network streaming device 109, unmanaged desktop computer 106, and a managed gateway 110, all located in a home residence 104 (the first location). The home gateway 110 may provide network connection to other network devices at the home residence 104. The system 100 further includes various network devices such as unmanaged smart TV 122, managed network streaming device 121 (or managed video surveillance devices, not shown in FIG. 1), unmanaged desktop computer 120, and a managed gateway 112, all located in a temporary residence 118 (the second location, such as a shared residence, as shown by 118). The gateway 112 may provide network connection to other network devices at the temporary residence 118.

A user of the home residence at 104 (or a user group including family members of residence 104) may be associated with various mobile or portable network devices, such as mobile phone 114 and laptop computer 116. The user may stay away for the home residence 104 at the temporary residence 118 for a period of time. The guest user may bring his/her mobile or portable network devices 114 and 116 to the temporary residence 118, as shown in FIG. 1. The network devices 112 and 121 at the temporary residence 118 may be automatically reconfigured to respectively emulate the home network devices 110 and 109 such that the network at the temporary residence can be used in identical manner as the home network devices. Further, the automatic reconfiguration of the network router device 112 allows instant connection by the mobile or portable network devices 114 and 116 without any modification of network settings in the mobile or portable network devices 114 and 116. The automatic reconfiguration of the various network devices at the temporary residence 118 may be achieved with help from various remote servers 102, 103, and 105, and remote data repositories 130 (alternatively referred to as external storage) for storing network device configurations, all of which may be connected to the gateways 110 and/or 112 via the provisioning communication channels as part of the communication network 101.

The managed network devices, such as the gateways 110 and 112 and the network streaming devices 109 and 121, may be provided by one or more service providers for installation at the home or temporary locations 104 and 118. They may be provisioned by the service providers via the server 102. For example, each of the gateways 110 and 112 may be provided with a service account at the server 102. Owners of the gateways 110 and 112 may register the gateways with the server 102 via the service accounts. Other managed network devices, such as the network streaming devices 109 and 121 may be provisioned by the same service provider as or different service provider from the service provider of the gateway. For example, the network streaming devices 109 and 121 may be provisioned by server 103.

Server 105 may be further provided as an application server to interwork with the servers 103 and 102 and the various network devices at the home and temporary locations 104 and 118 to provide a reconfiguration service to the various network devices at the temporary location 118 during a temporary period of stay of the guest user at the temporary location 118. The application server 105, for example, may provide a service account for the owner of the temporary location 118 (e.g., shared home or a rental home) to register his or her gateway 112 and other network devices for eligibility for the reconfiguration service.

FIGS. 2-7 illustrate various data and logic flows involved in examples of network device reconfiguration and restoration processes in the system 100 of FIG. 1. In FIGS. 2-7, the server 102 and 103 for provisioning the gateways 110 and 112 and other managed network devices are not differentiated and are implemented, for the purpose of automatic network device reconfiguration, as a combination of device authentication server (DAS) 210 and a device configuration server (DCS) 220. Each of the DAS 210 and DCS 220 are further associated with an authentication server database (ASDB) 270 and a configuration database (CDB) 230, respectively. The ASDB 270 and CDB 230 may implemented as part of the data repository 130 as depicted in FIG. 1. Further in FIGS. 2-7, the server 105 for provision the reconfiguration and restoration service may be implemented as a combination of an application server (AS) 310 and an application authentication server (AAS) 320. The AS 310, for example, may be associated with an application data base (ADB) 330 for providing data storage for the reconfiguration service, as part of the data repository 130 as depicted in FIG. 1.

Further in FIGS. 2-7, the managed network devices at the home location 104 are denotes as D1.x (with "1" representing location 1 or home location, and "x" representing device number) whereas the managed network devices at the temporary location are denoted as D2.x. Likewise, the gateway at the home location is denoted as GW1 whereas the gateway at the temporary location is denoted as GW2.

Figure 2:
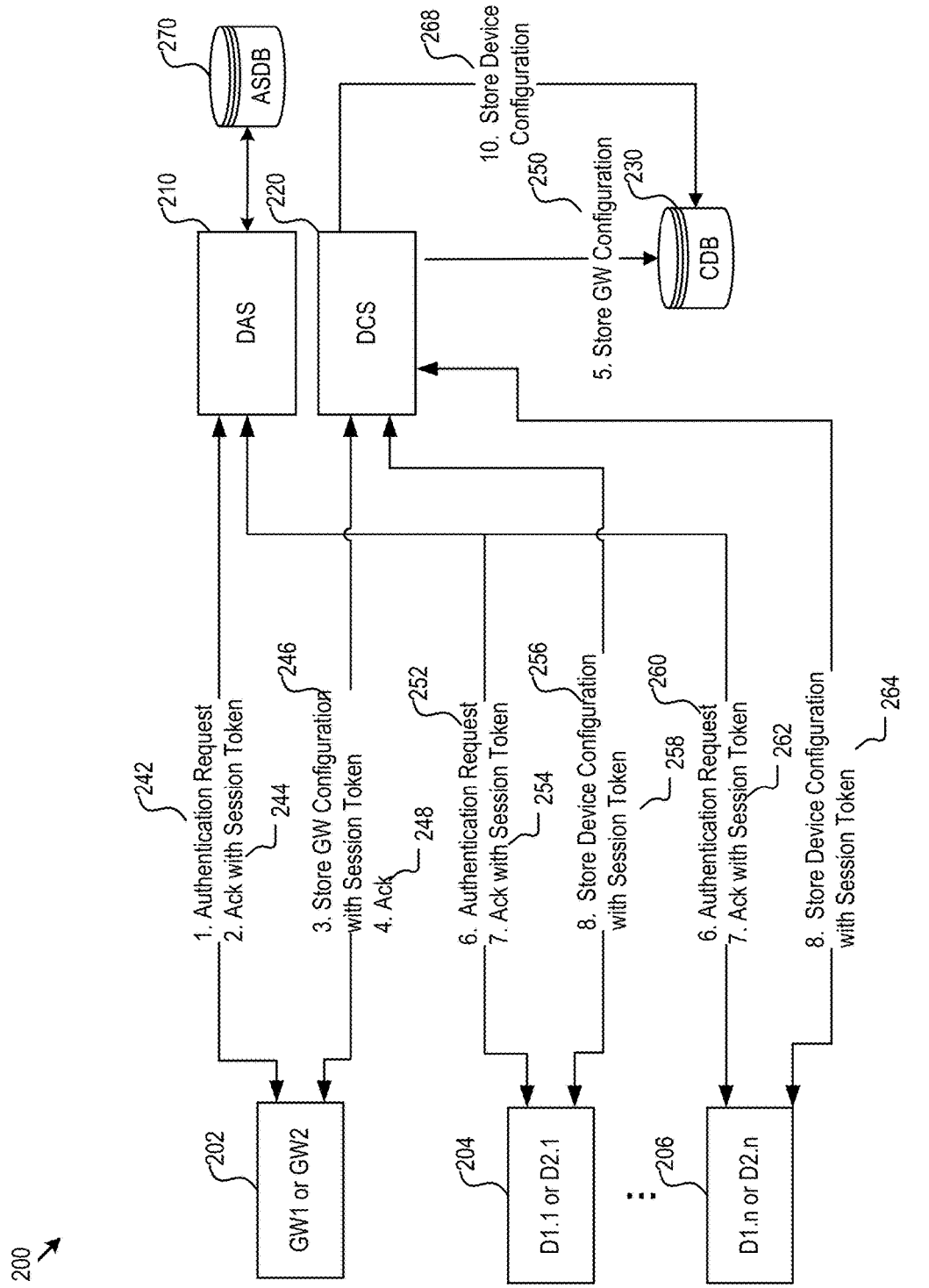
FIG. 2 shows an example of data and logic flow for authentication and remote storage and synchronization of configurations of gateways and other network devices.

FIG. 2 shows an example of data and logic flow 200 for configuration synchronization of gateways and various managed network devices with the service provider through the device authentication server (DAS) 210 and device configuration server (DCS) (220). The configuration synchronization logic flow 200 may be applicable to gateways and manage network devices at both the home location and the temporary location of FIG. 1, as shown in 202, 204, and 206 as GW1, GW2, D1.1 . . . D1.n and D2.1 . . . D2.n. The configuration synchronization process may be proceeded by a device registration process not shown in FIG. 1. The registration process for the home network devices and the temporary network devices may be performed by the user at the home location and the owner of the temporary location, respectively, after these network devices are installed and commissioned into operation. The registration process may involve establishing a service account with the DAS 210 and DCS 220 for a gateway and associated managed network devices. Each location may be associated with one service account. Under each service account, each devices may be associated with an authentication credential that are managed by the DAS 210 and stored in the authentication server database (ASDB) 270. Configuration synchronization service for the network devices may be granted only if the network devices are authenticated based on the service requests submitted from the network devices and the authentication information stored in ASDB 270.

The data and logic flow 200 includes several exemplary steps involved in the configuration synchronization for the gateway and managed network devices. The purpose of the configuration synchronization is to keep track of the current configuration in the network devices as the current configuration may be changed by the proprietors of the network devices. By employing the configuration synchronization flow 200, when network devices at the temporary location needs to be reconfigured, it would be reconfigured with the most up-to-date device configurations at the home location. Likewise, when the network devices at the temporary location need to be restored (at the end of the temporary stay of the guest user), the correct version of the configurations for the network devices at the temporary location can be determined for use in the restoration.

The data and logic flow 200 for configuration synchronization may include, for example, the following steps as indicated in FIG. 2:

1. As shown by 242, when there is any update/modification of configuration, the gateway (GW1 or GW2, shown by 202) authenticates with DAS 210 for configuration synchronization. In particular, the gateway send a configuration storage request to the DAS 210 together with authentication credential provided to the gateway during the registration process through a corresponding service account with the DAS 210. The DAS 210 authenticates the gateway by comparing the authentication credential included in the request to the authentication credential recorded in the ASDB 270 for the gateway.

2. Upon successful authentication of the gateway 202, the DAS 210 sends an acknowledgement to the gateway 202, as shown by 244. The acknowledgment may include a session token for next configuration update and storage transactions.

3. As shown by 246 of FIG. 2, the gateway 202 send its current state or configuration to the DCS 220 for storage in the CDB 230. Various format may be used by the gateway 202 to transmit its current state or configuration. For example, TR181, TR069, a Rest API, SNMP or other device management protocols or formats may be used to encapsulate and transmit the current state or configuration. Information sent to the DCS 220 for storage may include, for example, WiFi service set identifier (SSID) and passcode for the gateway, and other device state and settings such as parental control settings and other network access restriction settings.

4. After storing the information in the CDB 230, the DCS 220 provides acknowledgment to the gateway 202, as shown by 248 of FIG. 2.

5. As shown by 250 of FIG. 2, the DCS 220, upon receiving the gateway configuration information in 246, proceed to store the received gateway configuration in CDB 230.

6. Likewise, each of the other managed device (D1.1-D1.n and D2.1-D2.n) 204 and 206 may request synchronization of its current state and configuration with the DAS 210 (assuming that these devices have been registered with the DAS 210 when installed and have been given authentication credentials) by sending an authentication request to the DAS 210, as shown by 252 and 260 of FIG. 2.

7. Upon successful authentication of the network devices 204 and 206, the DAS 220 sends acknowledgement to the network devices 204 and 206, as shown by 256 and 264 of FIG. 2. The acknowledgment may include a session token for next configuration update and storage transactions for the network devices.

8. Each of the network device 204 and 206 sends its current state or configuration to the DCS 220 for storage in the CDB 230, as shown by 254, 258, and 264 of FIG. 2. Like the gateway 202, various format may be used by the network devices 204 and 206 to transmit their current state or configuration. For example, TR181, TR069, a Rest API, SNMP or other device management protocols or formats may be used to encapsulate and transmit the current state or configuration. Information sent to the DCS 220 for storage may include network SSID and passcode used by the network device 204 and 206 to access the gateway 202 and other personal settings in the network device 204 and 206 as described above.

9. As shown by 268, the DCS 220, upon receiving the network device configuration information in 252, 246, and 260, proceed to store the received updated network device state and configuration information in CDB 230.

The example configuration synchronization data and logic flow 200 in FIG. 2 may also be applied to other unmanaged network devices which may be effective turned into managed network devices as described above. For example, the DAS 210 and DCS 220 (and associated ASDB 270 and CDB 230) from the service provider may be expanded to support unmanaged network work devices that may have access to the provisioning communication channels. Alternatively, servers provided by a third party servicer may be involved in configuration synchronization of the unmanaged network devices following the example data and logic flow in FIG. 2.

Figure 3:
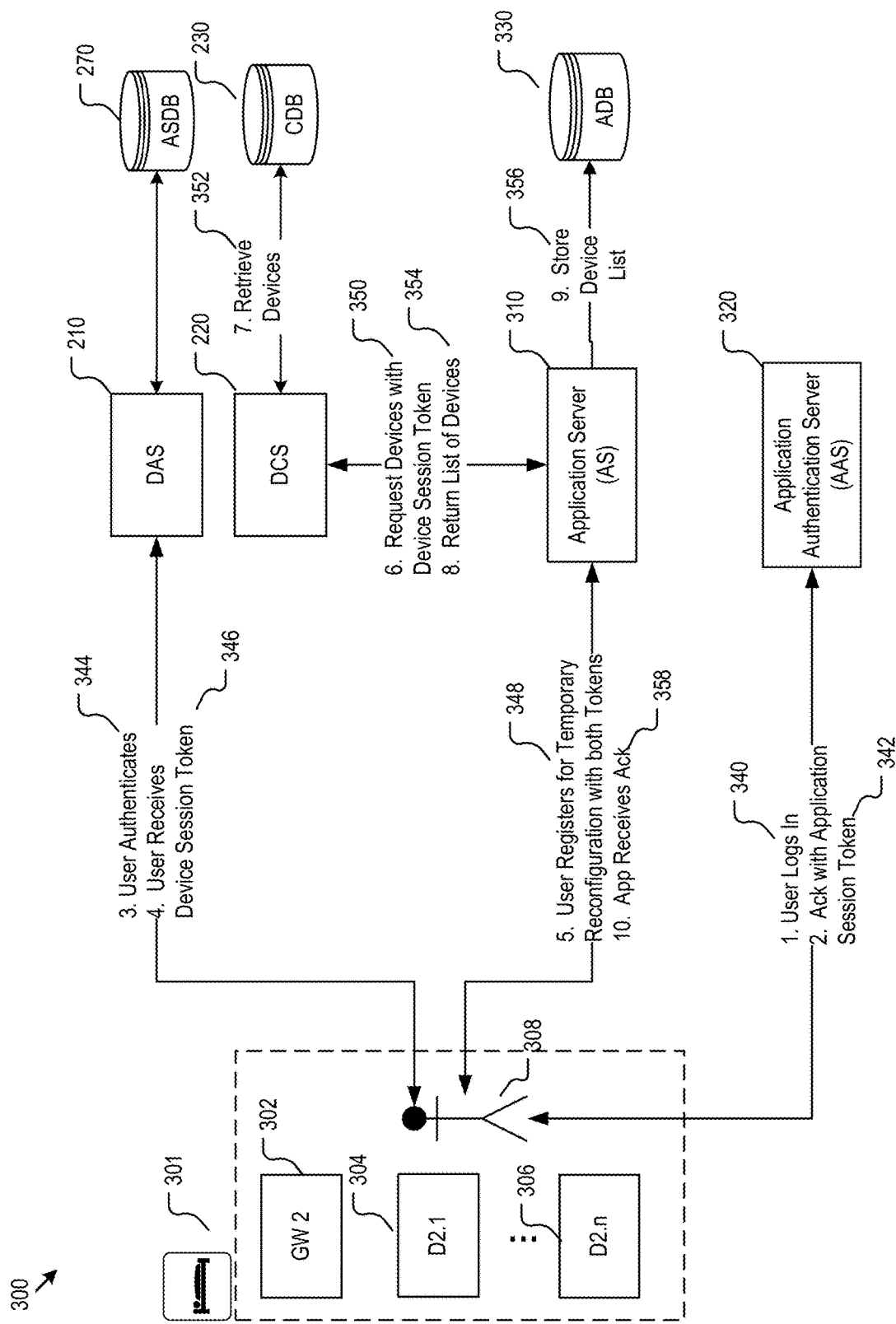
FIG. 3 shows an example of data and logic flow for registering a set of gateways and other network devices to be eligible for temporary reconfiguration.

FIG. 3 shows an example of data and logic flow 300 for registration of gateways and managed network devices via an application server (AS) 310 and application authentication server (AAS) 320 such that the registered gateway and network devices may become eligible for temporary reconfiguration service. The registration process in FIG. 3 is illustrated for the gateway 302 and network devices 304 and 306 at the temporary location 301. The registration may be initiated by the owner 308 of the temporary location 301. For example, the owner 308 of a residence 301 may desire to offer this/her residence for home sharing or home hoteling. He/she may then equip his/her residence with a gateway and other managed network devices for use by renters who will temporarily occupy his/her residence. He/she may start by registering his/her gateway and network devices following the example data and logic flow 300 of FIG. 3.

When the owner 308 of the gateway GW2 (302) and network devices D2.1-D2.$n$ (304 and 306) wishes to offer his/her residence for sharing/renting, he/she registers GW2 and D2.1-D2.$n$ with the AS 310 to make GW2 and D2.1-D2.$n$ eligible for reconfiguration service by first setting up an service account with the AS 310 (not shown in FIG. 3). The registration process may be performed via, for example, a mobile application, a website, or other applications provided by the reconfiguration service provider through the application server (AS) 310 and application authentication server (AAS) 320. The example registration process 300 for the reconfiguration service may include the following steps:

1. The owner 308 may first log into his/her service account with the AS 310 via the AAS 320, as shown in 340 of FIG. 3. The AAS 320 may be responsible for authenticating the owner login.

2. Upon successful authentication of the owner login, the AAS 320 may then send an acknowledgement together with an application session token to the owner 308 via the application or website used by the owner to access the application server, as shown in 342 of FIG. 3.

3. The owner 308 further authenticates with the DAS 210 with respect to his/her devices GW2 (302) and D2.1-D2.$n$ (304 and 306), as shown in 344 of FIG. 3. The authentication by DAS 210 of the owner may be based on the owner service account established with the DAS 210 as described above in relation to FIG. 1. The invocation of this authentication may be embedded within the application or website used by the owner for reconfiguration service registration. In some implementations, the DAS 210 and AS 310 may collapse into an integrated server or server cluster, particularly when the provisioning of the gateway and the managed network devices and the reconfiguration service are provided by a same service provider.

4. Upon successful device authentication, the DAS 210 sends an acknowledgment together with network device session tokens to the owner 308 via the application or website used by the owner to access the application server, as shown in 346 of FIG. 3.

5. The owner 308, via the application or website used by the owner to access the application server, may then register his/her gateway and/or network devices as being eligible for temporary reconfiguration service with AS 310, as shown by 348 of FIG. 3. Both the application session token obtained above in step 2 and the network device session tokens obtained in step 4 may be sent to the AS 310.

6. Upon receiving the registration request, the AS 310 may request the list of all network devices corresponding to the device session tokens (GW2 and D2.1-D2.$n$) from the DCS 220, as shown by 350 of FIG. 3.

7. Upon receiving the request for the list of network devices, the DCS 220 retrieves the list of devices associated with the device session tokens from the CDB 230, as shown by 352 of FIG. 3.

8. The DCS 220 then returns the list of network devices associated with the device session tokens to the AS 310, as shown in 354 of FIG. 3.

9. Once the AS 310 receives the list of network devices, it stores the list of network devices and their associated session tokens for future reconfiguration service in an application data base (ADB) 330 to complete the registration of the gateway GW2 (302) and network devices D2.1-D2.$n$ (304 and 306) for eligibility for reconfiguration service, as shown in 356 of FIG. 3.

10. The AS 310 then sends an acknowledgement indicating completion of successful registration to the owner via the application or website used by the owner to access the application server, as shown in 358 of FIG. 3.

Following the data and logic flow 300 in FIG. 3, owner 308 completes registering his/her gateway (GW2) and network devices (D2.1-D2.$n$) for reconfiguration service eligibility. When his/her residence is temporarily taken by a renter, the renter may then initiate an automatic reconfiguration of the GW2 and D2.1-D2.$n$ through a reconfiguration process.

Figure 4:
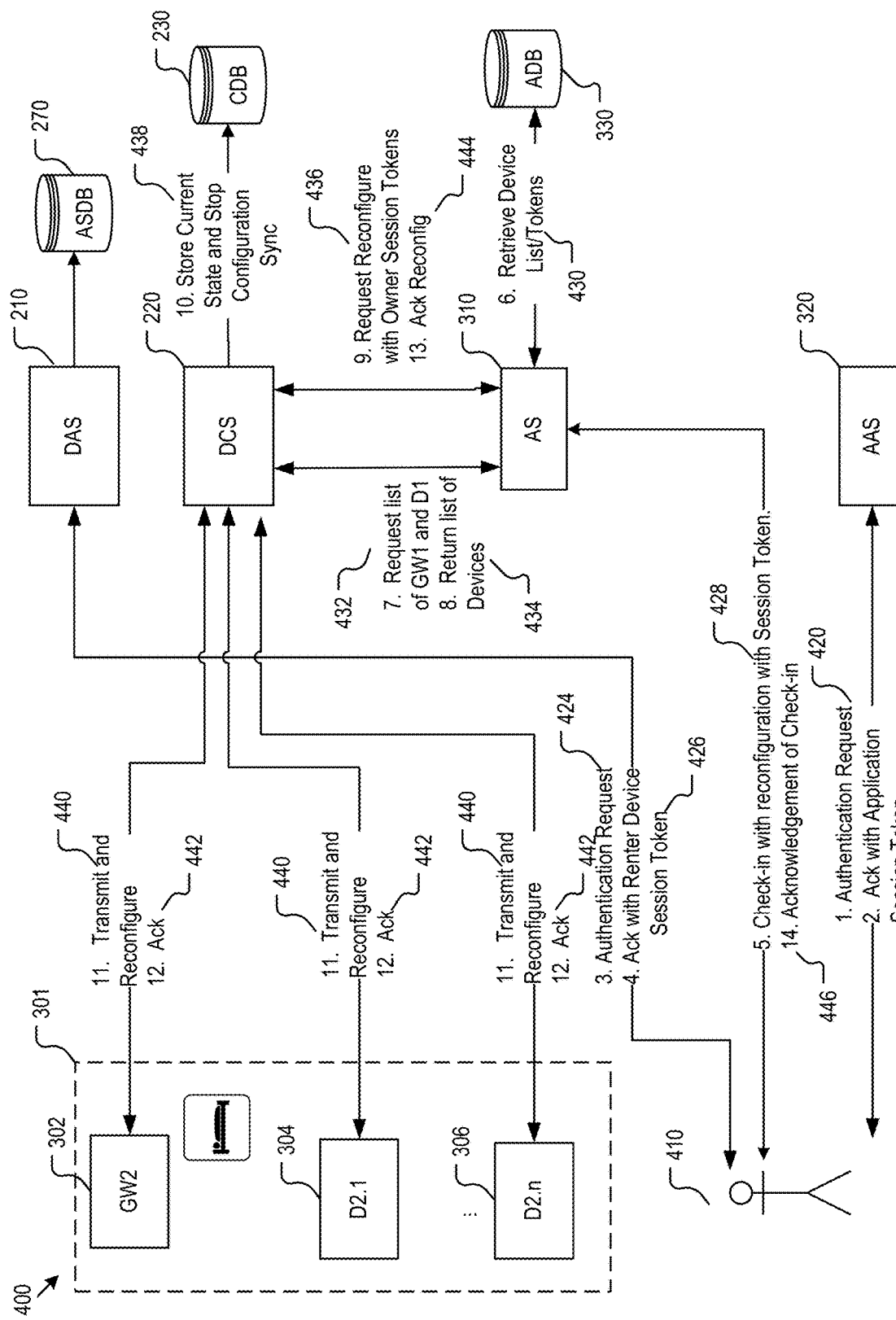
FIG. 4 shows an example of data and logic flow for initiating and completing a temporary reconfiguration of a set of gateways and other network devices.

FIG. 4 shows an example data and logic flow 400 for such a reconfiguration process initiated by the renter 410. The reconfiguration flow 400 may be implemented as part of an overall check-in process. For example, the renter may use a residence-sharing application (e.g., a mobile application, or website) for searching and booking a residence for temporary stay. The owner 308 of the residence 301 may have listed his residence 301 for sharing/renting. The renter 410 may book residence 301 for temporary stay using the residence-sharing application. The renter may further use the residence-sharing application to check into the residence 301 upon arrival and check out upon at the end of the temporary stay. The check-in functionality of the residence-sharing application may include mechanisms for the renter to initiate the reconfiguration flow 400.

The application used by the owner 308 in registering his/her gateway and network for reconfiguration service may be implemented as an integral part of the residence-sharing application. Specifically, the residence-sharing application may provide various application interfaces to its users. One of the application interfaces, for example may be provided for residence owners to list their residence for renting. Another of the application interfaces may be provided for the residence owners to register their gateway and network devices for reconfiguration eligibility following, for example, the data and logic flow 300 of FIG. 3. Yet another of the application interfaces of the residence-sharing application may be provided for renters to search for posting of residences. And finally, one of the application interfaces of the residence-sharing application may be provided for the renters to perform electronic check-in upon arrival at a residence of his/her choice and invoke the exemplary reconfiguration data and logic flow 400 in FIG. 4. The renter 410 or owner 308 may each login into the residence-sharing application using their pre-established service accounts and access the various application interfaces via, for example, a menu system in the residence-sharing application. The residence-sharing application may be accessed on a mobile phone or other electronic devices.

While the check-in may be performed via an application interface in the residence-sharing application, it may be directed invoked simply by the renter logging into the residence-sharing application without having to navigating to a particular check-in application interface. In some implementations, the check-in process may also be implemented as an application embedded in any of the gateway GW2 or network devices D2.1-D2.n at the rental location 301. Alternatively, it may be invoked using a dedicated external device. Such external device may be an accessary of the any of the gateway GW2 or network devices D2.1-D2.n at the rental location 301. For example, such external device may be an accessary of the gateway GW2. For another example, such external device may be an accessory of a streaming device at the rental location 301. Such accessary device may be used, for example, to invoke a check-in application interface in the GW2 or the streaming device. The external check-in device may also be implemented as a dedicated standalone device with an operational interface for the renter to initiate the check-in process with the residence-sharing application server. Such standalone devices may communicate with the residence-sharing application server via the GW2.

In the exemplary reconfiguration data and logic flow 400 of FIG. 4, the same AS 310 and AAS 320 as those of FIG. 3 are indicated as providing the reconfiguration services in addition to the eligibility registration service described in FIG. 3. The AS 310 and AAS 320 may be further used to provide and support other functionalities or the entirety of the residence-sharing application. The reconfiguration data and logic flow 400 may include the following exemplary steps:

1. The renter 410 may first log into the residence-sharing application with the AS 310 via the AAS 320 using his/her pre-established user account as an authentication request, as shown in 420 of FIG. 4.

2. The AAS 320 receives the authentication request, performs an authentication, and returns an acknowledgement together with an application session token to the renter 410 via the residence-sharing application, as shown in 422 of FIG. 4.

3. As shown in 424 of FIG. 4, the renter 410 further sends login and authentication request to the DAS 210. In some implementations, the DAS 210 and AS 310 may collapse into an integrated server, particularly when the provisioning of the gateway and the managed network devices and the reconfiguration service are provided by a same service provider.

4. Upon successful authentication, the DAS 210 sends an acknowledgement along with renter device session tokens associated with gateway and network devices installed in the home location for the renter (GW1 and D1.1-D1-$n$ in FIG. 2), as shown in 426 of FIG. 4. The renter device session tokens may uniquely identifies the renter and allows access to device information associated with the renter in DCS 220.

5. As shown in 428 of FIG. 4, the renter 410 may initiate a check-in request via the residence-sharing application to invoke network work reconfiguration with the AS 310 using the application session token obtained from the AAS 320 in step 2 (422). The renter device session tokens may be also sent to the AS 310 along with the check-in request.

6. Upon receiving the check-in and reconfiguration request from the renter 410 via the residence-sharing application, the AS 310 retrieves the list of gateway 302 and network devices 304 and 306 associated with the residence 301 (GW2, D2.1-D2.$n$) from the ADB 330, as shown in 430 of FIG. 4. In some implementations, the AS 310 may identify the rental residence (301) via its residence booking functionality under the renter account. The AS 310 may thus be able to identify the device list for residence 301 when the check-in request is sent from the renter 410 in step 428.

7. The AS 310 further requests from the DCS 220 the list of home gateway and network devices associated with the renter device session tokens obtained in step 4 (426) and corresponding device configurations, as shown in 432.

8. The DCS 220 retrieves the list of home gateway and network devices of the renter and their current up-to-date configurations (synchronized following the data and logic flow 200 in FIG. 2) and returns the list and configurations to AS 310, as shown in 434 of FIG. 4.

9. The AS 310 then compares the list of owner devices (at residence 301) and the list of home devices of the renter to determine an overlap in device types. For each corresponding overlapping device, e.g. GW1 to GW2, streaming device 1 to streaming device 2, the AS 310 requests the DCS 220 to temporarily reconfigure the owner device using the current setting of the corresponding overlapping renter device, as shown in 436 of FIG. 4.

10. Upon receiving the reconfiguration request, the DCS 220 confirms that the current configuration information for each device to be reconfigured in the list of owner devices (GW2, D2.1-D2.$n$) are stored or backed up in the CDB 230, as shown in 438 of FIG. 4. In the case that the owner device settings are configured to be synchronized in the CDB (see description above in relation to FIG. 2), the DCS 220 may stop such synchronization of the configurations of the owner device and freeze the current configurations of the owner devices in CDB 230 for later restoration.

11. As shown in 440 of FIG. 4, for each owner device to be reconfigured (e.g., GW2, D2.1-D2.*n*), the DCS 220 modifies its configuration using the corresponding renter configuration that can be obtained from the CDB 230 by the DCS 220. The configuration modification may be implemented using protocol such as TR181, TR069, Rest API, SNMP or other protocols.

12. As shown in 442 of FIG. 4, each owner device acknowledges the reconfiguration.

13. Following the successful reconfiguration, the DCS 220 sends acknowledgement to the AS 310 to inform the AS 310 that the reconfiguration has completed, as shown in 444 of FIG. 4.

14. Finally, the AS 310 relays reconfiguration complete acknowledgement to the renter via the residence-sharing application. If there is no other pending check-in actions, the AS 310 informs the renter that check-in process has completed, as shown in 446 of FIG. 4.

The example described above in reference to FIG. 4 thus provides an example of data and logic flow for the renter to invoke the reconfiguration of the network devices at the temporary location (rental residence 301). As shown by exemplary implementation below, at the end of the renter stay at the residence 301, the renter may initiate a check-out process to automatically restore the owner devices 302, 304, and 306 to their configurations prior to the reconfiguration.

Figure 5:
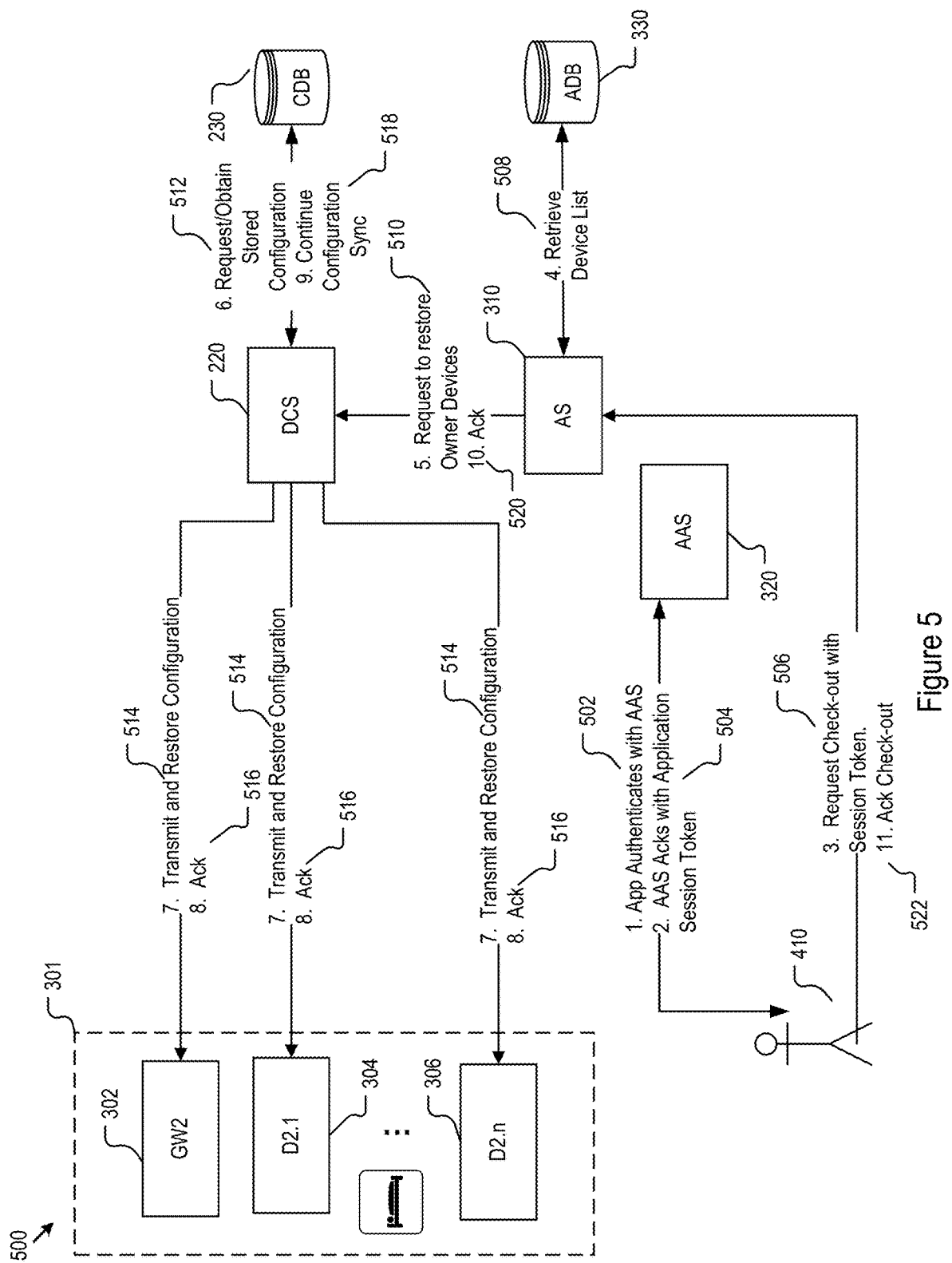
FIG. 5 shows an example of data and logic flow for restoring configurations of the set of gateways and other network devices.

Such an exemplary check-out process and configuration restoration is illustrated in data and logic flow 500 of FIG. 5. In FIG. 5, the renter 410 may initiate the check-out process by using, again, the residence-sharing application. The restoration of configuration of the devices 302, 304 and 306 as shown in FIG. 5, may include the following exemplary steps:

1. The renter 410 may log into the residence-sharing application by sending an authentication request to the AS 310 via the AAS 320 to initiate a check-out process at the end of the temporary stay, as shown in 502 of FIG. 5.

2. The AAS 320 receives the login and authentication request, performs an authentication, and returns an acknowledgement together with an application session token to the renter via the residence-sharing application, as shown in 504 of FIG. 5.

3. The renter 410 then requests check-out in a check-out application interface of the residence-sharing application by sending the check-out request along with the application session token received in step 2 to the AS 310, as shown in 506 of FIG. 5. The check-out request may act to initiate the restoration of the configuration of the owner devices 302, 304, and 306.

4. The AS 310 then retrieves a list of owner devices determined and recorded at the check-in time by the renter 410, as shown in 508 of FIG. 5.

5. For each owner device (302, 304, and 306), the AS 310 requests the DCS 220 to restore the owner configuration stored in the CDB 230 prior to the renter check-in, as shown in 510 of FIG. 5.

6. The DCS 220 retrieves the stored owner configuration information for each owner device (stored in step 10 (438) of FIG. 4) from the CDB 230, as shown in 512 of FIG. 5.

7. As shown in 514 of FIG. 5, the DCS 220 restores the configuration for each owner device (302, 304, and 308) to the owner configuration obtained in step 6 via protocols such as TR181, TR069, Rest API, SNMP, and the like.

8. As shown in 516 of FIG. 5, each owner device acknowledges the restoration of the configuration to the DCS 220.

9. As shown in 518 of FIG. 5, the DCS 220 may then restart the owner device configuration synchronization stopped at step 10 of FIG. 4. The restarted configuration synchronization may follow the exemplary data and logic flow of FIG. 2.

10. As shown in 520 of FIG. 5, each configuration restoration of the owner device 302, 304, and 306 maybe acknowledged to the AS 310 by the DCS 220.

11. Finally, as shown in 522 of FIG. 5, the AS 310 acknowledges the completion of configuration restoration for the owner devices 302, 304, and 306 to the renter 410 via the residence-sharing application.

Figure 6:
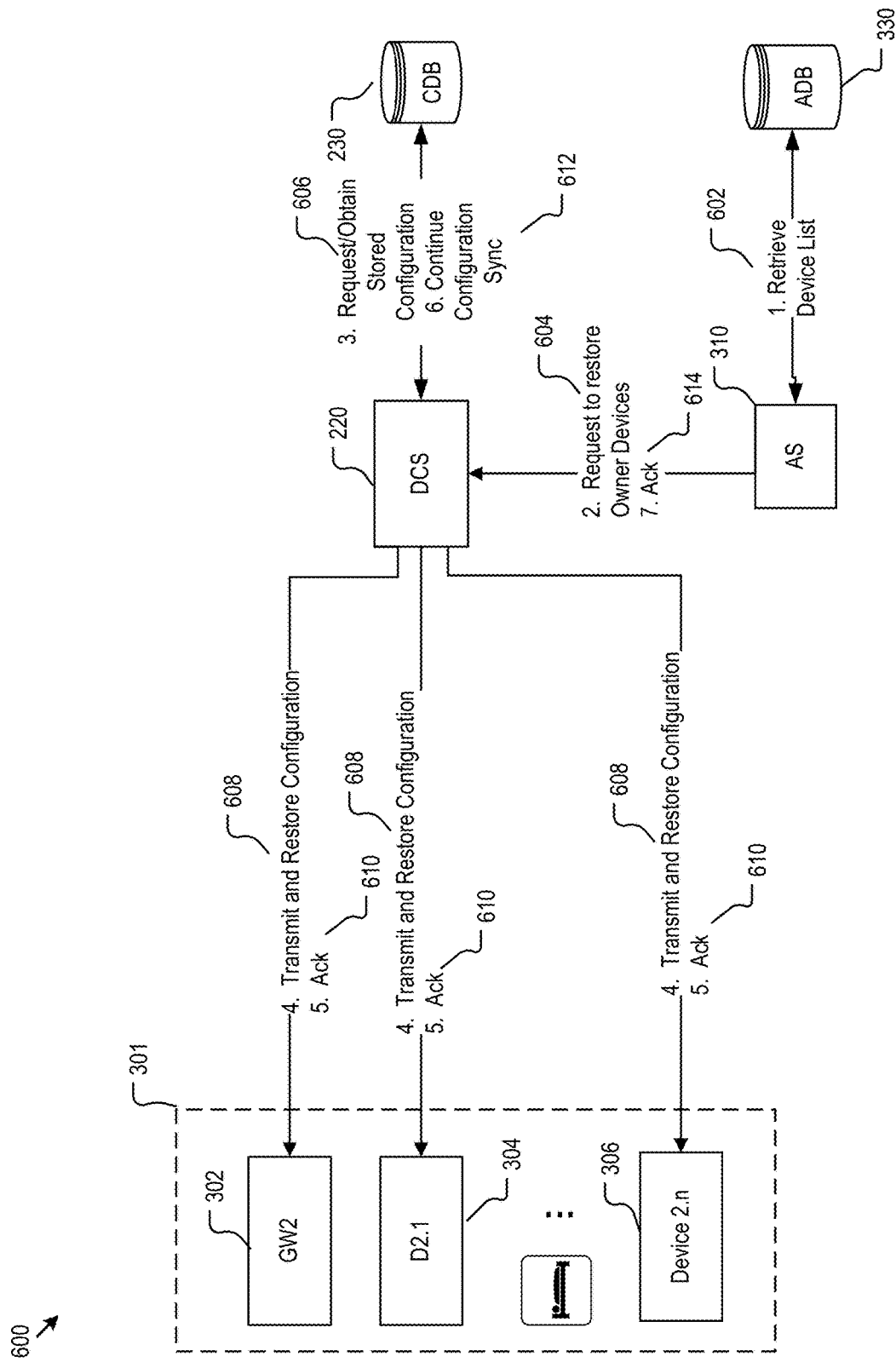
FIG. 6 shows another example of data and logic flow for restoring configurations of the set of gateways and other network devices.

The automatic restoration of the configuration in the implementation of FIG. 5 described above is invoked by the check-out request from the renter 410. Alternatively the restoration process may be initiated by the AS 310 without any involvement of the renter 410. This alternative restoration implementation is shown in the example of data and logic flow 600 in FIG. 6. The data and logic flow 600 is mostly similar to the data and logic flow 500 except that the steps involving the renter 410 are absent. Specifically, the AS 310 may initiate the restoration process when detecting, for example, that the temporary duration of stay for the renter has come to an end by setting a timer. Steps 1 (602), 2 (604), 3 (606), 4 (608), 5 (610), 6 (612), and 7 (614) of FIG. 6 are identical to steps 4 (508), 5 (510), 6 (512), 7 (514), 8 (516), 9 (518), and 10 (520) of FIG. 5, respectively.

Figure 7:
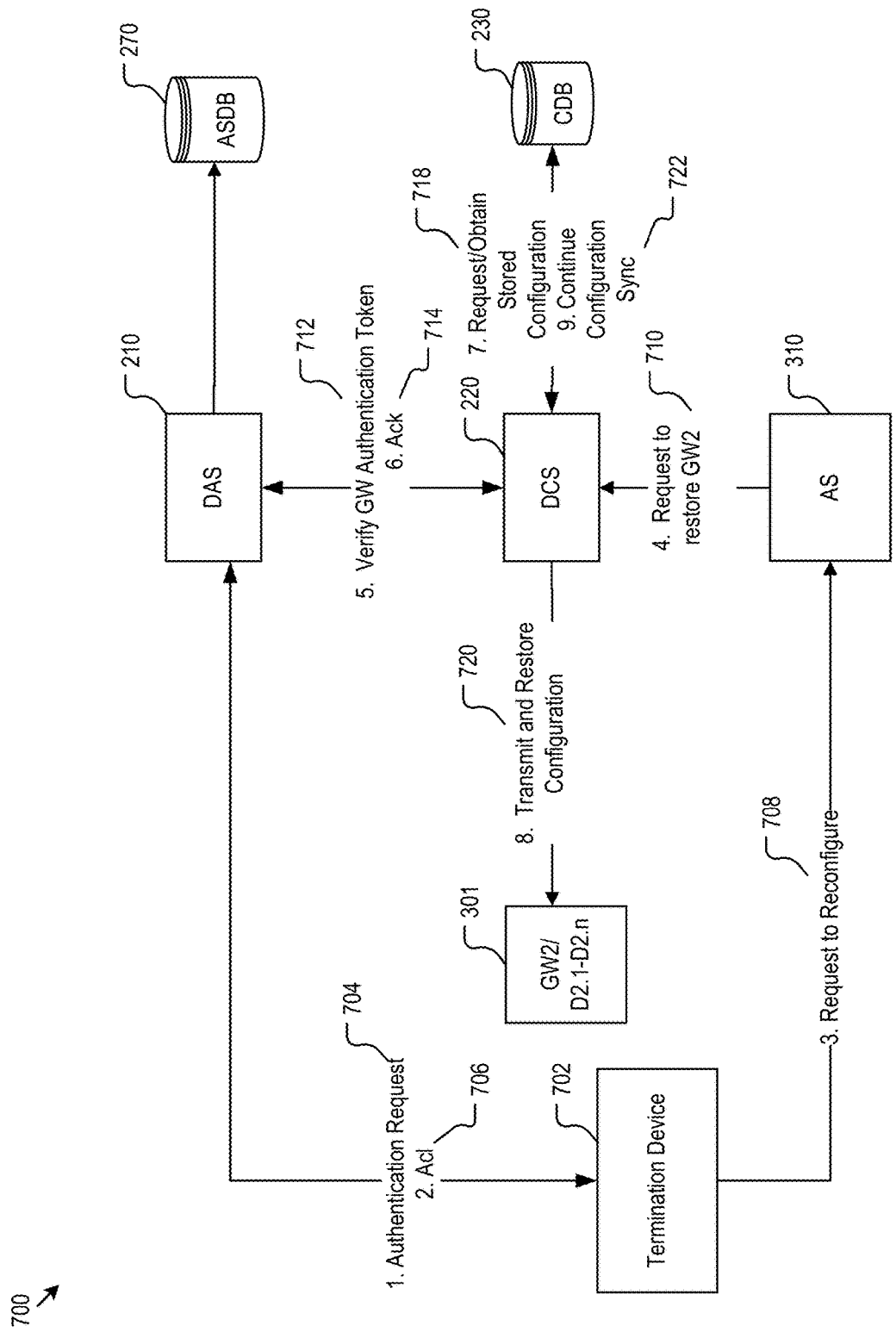
FIG. 7 shows yet another example of data and logic flow for restoring configurations of the set of gateways and other network devices.

FIG. 7 shows another example of data and logic flow 700 for restoring owner device configuration. As shown in FIG. 7, the restoration process may be invoked from a termination device 702. This termination device 702 may be implemented as an application running on one of the managed network devices in the rental residence (e.g., D2.1-D2.*n* in rental residence 301 of FIGS. 3-6). For example, termination device 702 may be integral part of the gateway GW2. For another example, the termination device may be an integral part of a streaming device at the rental location 301. The termination device 702 may alternatively be implemented as a standalone physical device that can be accessed by the renter or by the owner of the rental residence 301. For example, the renter or the owner may invoke the restoration by pressing either a physical or software button on the termination device 702. The restoration steps of FIG. 7 are largely similar to those of FIGS. 5 and 6 and are described below:

1. As shown in 704, the termination device 702, once invoked for restoration of the configuration of the owner devices, contacts the DAS 210 to confirm that the terminal device 702 is a legitimate device or application. In some implementations, the termination device 702 may be pre-registered with the DAS 210 with authentication credentials that are stored in the ASDB 270 and associated with the owner devices GW2 and D2.1-D2.*n*.

2. Upon successful authentication, the DAS 210 issues a confirmation and an authentication token associated with the network devices GW2 and D2.1-D2.*n* in the rental residence 301, as shown in 706 of FIG. 7.

3. The termination device then sends a request for restoring configuration of the owner network devices to the AS 310, as shown in 708 of FIG. 7. The request may carry the authentication token obtained in step 2 that are associated with the owner network devices at the rental residence 301.

4. As shown in 710 of FIG. 7, the AS 310 passes the request to restore configuration to the DCS 220 along with the authentication token received in step 3.

5. As shown in 712 of FIG. 7, the DCS 220 communicates with the DAS 210 for verifying the authentication token and its association with the network device GW2 and D2.1-D2.*n*.

6. As shown in 714 of FIG. 7, the DAS 210 verifies the authentication token via the ASDB 270 and sends an acknowledges to the DCS 220.

7. As shown in 718 of FIG. 7, the DCS 220 retrieves the stored owner configuration information for each owner device (stored in step 10 (438) of FIG. 4) from the CDB 230.

8. As shown in 720 of FIG. 7, the DCS 220 restores the configuration for each owner devices at the rental residence 301 to the owner configuration obtained in step 7 via protocols such as TR181, TR069, Rest API, SNMP, and the like 9. As shown in 722 of FIG. 5, the DCS 220 may then restart the owner device configuration synchronization stopped at step 10 of FIG. 4. The restarted configuration synchronization may follow the exemplary data and logic flow of FIG. 2.

As described above in the example data and logic flows in FIGS. 2-7, when a user travels away from location 1 (home location) to location 2 (temporary location), the configuration and settings for his/her home gateway device may first be retrieved, stored, and synchronized in an external storage for device reconfiguration purposes. Further, configurations and settings for other home network devices at location 1 may also be retrieved, stored, and synchronized in the external storage. The user may then perform a check-in or login process to location 2 using an application or external device. This check-in or login automatically triggers an reconfiguration of the network devices at location 2 as follows:

The original gateway configuration at location 2 is retrieved and stored in the external storage (alternatively, the configuration of the gateway at location 2 may be synchronized to the external storage, similar to the gateway device at location 1).

The original configuration and settings of the other network devices at location 2 are retrieved and stored in the external storage (alternatively, the configuration of the other network devices at location 2 may be synchronized to the external storage).

A reconfiguration request is triggered from an application, the gateway device at location 2, or other devices.

The configuration and settings for the gateway device at location 1 as stored in the external storage are retrieved and provided to the gateway device at location 2 to reconfigure the gateway device at location 2.

The configuration and settings for other network devices at location 1 as stored in the external storage are retrieved and provided to the corresponding other network devices at location 2 to reconfigure the other network device at location 2.

Following the reconfiguration process described above, the user may then access the network devices at location 2 in a same manner as accessing the network devices at location 1 (home location). The user may further access the gateway device at location 2 from his/her the mobile or portable network devices without any reconfiguration of network settings in the mobile or portable network devices.

As described in the various implementations in FIGS. 2-7, when the user leaves location 2 and returns to home location 1, a restoration of the configurations for the network devices at location 2 to their original configurations may be invoked in the following manner:

The restoration process may be invoked from an application, the gateway at location 2, or from other external devices, by the user or by the owner of location 2.

The restoration request may be sent to the external storage.

The original configuration and settings for the gateway device at location 2 are then retrieved from the external storage to restore the configuration and settings of the gateway device at location 2.

The original configurations and settings for other network devices at location 2 are likewise retrieved from the external storage to restore the configuration and settings of the other network devices at location 2.

While the examples above are described in the context of a residence-sharing and reconfiguration and restoration of network settings, the underlying principles are further applicable to automatic reconfiguration and restoration of other settings in other stateful devices.

Figure 8:
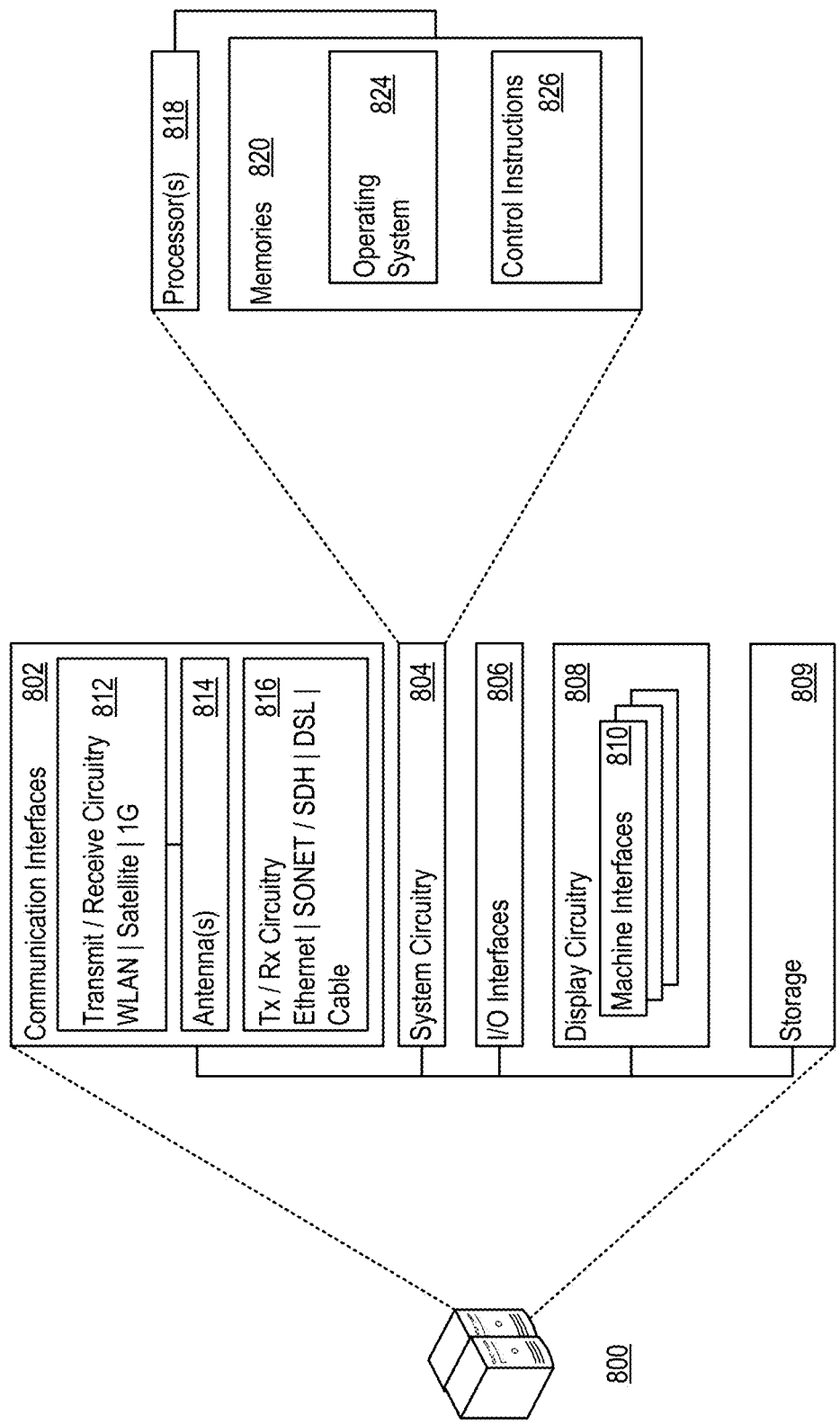
FIG. 8 shows an example of computer device that may be used as various computing components in the system illustrated in FIG. 1.

Finally, FIG. 8 shows an exemplary computing device 800 that may be used for implementing various computing components of system 100 shown in FIG. 1 and various server components in FIGS. 2-7 (such as the DAS 210, the DCS 220, the AS 310, and the AAS 320). The system 100 may be implemented by multiple such computers. These computers may be dedicated physical machines or may be virtual machines. They may be located in one geographic locations or may be geographically distributed.

Each computer 800 may include communication interfaces 802, system circuitry 804, input/output (I/O) interfaces 806, storage 809, and display circuitry 808 that generates machine interfaces 810 locally or for remote display. The machine interfaces 810 and the I/O interfaces 806 may include GUIs, touch sensitive displays, voice or facial recognition inputs, buttons, switches, speakers and other user interface elements. Additional examples of the I/O interfaces 806 include microphones, video and still image cameras, headset and microphone input/output jacks, Universal Serial Bus (USB) connectors, memory card slots, and other types of inputs. The I/O interfaces 806 may further include magnetic or optical media interfaces (e.g., a CDROM or DVD drive), serial and parallel bus interfaces, and keyboard and mouse interfaces.

The communication interfaces 802 may include wireless transmitters and receivers ("transceivers") 812 and any antennas 814 used by the transmitting and receiving circuitry of the transceivers 812. The transceivers 812 and antennas 814 may support Wi-Fi network communications, for instance, under any version of IEEE 802.11, e.g., 802.11n or 802.11ac. The communication interfaces 802 may also include wireline transceivers 816. The wireline transceivers 816 may provide physical layer interfaces for any of a wide range of communication protocols, such as any type of Ethernet, data over cable service interface specification (DOCSIS), digital subscriber line (DSL), Synchronous Optical Network (SONET), or other protocol.

The storage 809 may be used to store various initial, intermediate, or final data or model for object/landmark recognition, segmentation, and further data analytics. The storage 809 may further store training aerial images, land maps, and land registry data used for training and deployment of the object/landmark recognition and segmentation models, and various data analytics based on the output of the models. The storage 809 may be centralized or distributed. For example, it may be hosted remotely by a cloud computing service provider.

The system circuitry 804 may include hardware, software, firmware, or other circuitry in any combination. The system circuitry 804 may be implemented, for example, with one or more systems on a chip (SoC), application specific integrated circuits (ASIC), microprocessors, discrete analog and digital circuits, and other circuitry. The system circuitry 804 is part of the implementation of any desired functionality related to the training, deployment, and data analytics of the object/landmark recognition and segmentation models and systems. As just one example, the system circuitry 804 may include one or more processors 818, such as instruction processors, and memories 820. The memories 820 may store, for example, control instructions 824 and an operating system 822. The memories 820 may be standalone, or may alternatively be embedded with the processors 818 for fast data access. In one implementation, the processors 818 execute the control instructions 824 and the operating system 822 to carry out any desired functionality related to the system 100.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The various servers, storages, and applications may further be implemented as cloud instances. For example, the DAS 310, DCS 220, AS 310, and AAS 320, alone or in combination, may be implemented as virtual machines distributed within one or more cloud platform.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

The implementation above may be embodied as computer instructions stored in a non-transitory computer-readable medium. These instructions, when executed by a processor, causes the processor to perform the various functions described above.

Various implementations have been specifically described. However, many other implementations are also possible.

What is claimed is:

1. A system comprising:
   a repository for storing device configurations; and
   a processor in communication with the repository, wherein the processor, when executing a set of computer instructions, is configured to:
      receive a first configuration information of a first network device;
      transmit the first configuration information to the repository for storage;
      receive a configuration request to automatically configure a second network device according to the first configuration information wherein the second network device is originally configured with a second configuration information;
      request and receive the second configuration information from the second network device;
      transmit the second configuration information to the repository for storage;
      retrieve the first configuration information from the repository;
      transmit the first configuration information to the second network device;
      automatically configure an operation of the second network device with the first configuration information; and
      upon receiving a checkout request during the operation of the second network device:
         retrieve the second configuration information from the repository;
         remove the first configuration information from the second network device; and
         automatically restore the configuration of the operation of the second network device with the second configuration information.

2. The system of claim 1, wherein the processor is configured to transmit the first configuration information and second configuration information to the repository via a cloud connection.

3. The system of claim 1, wherein the repository is hosted in a cloud computing platform.

4. The system of claim 1, wherein the first network device and the second network device comprise a network router and the first configuration information and the second configuration information comprises a user profile, a user password, user preference setting, and a network router Service Set Identifier (SSID).

5. The system of claim 1, wherein the processor is configured to receive the first configuration information, receive the configuration request, and receive the checkout request via a remote integrated application interface.

6. The system of claim 5, wherein the remote integrated application interface is accessed via a user login using a user login account.

7. The system of claim 6, wherein the configuration request is remotely generated automatically by the user login.

8. A method for configuration of network devices, comprising:
  receiving a first configuration information of a first network device;
  transmitting the first configuration information to a repository for storing network device configuration information;
  receiving a configuration request to automatically configure a second network device according to the first configuration information wherein the second network device is originally configured with a second configuration information;
  requesting and receiving the second configuration information from the second network device;
  transmitting the second configuration information to the repository for storage;
  retrieving the first configuration information from the repository;
  transmitting the first configuration information to the second network device;
  automatically configuring an operation of the second network device with the first configuration information; and
  upon receiving a checkout request during the operation of the second network device:
    retrieving the second configuration information from the repository;
    removing the first configuration information from the second network device; and
    automatically restoring the configuration of the operation of the second network device with the second configuration information.

9. The method of claim 8, wherein transmitting the first configuration information and second configuration information to the repository comprises transmitting the first configuration information and second configuration information to the repository via a cloud connection.

10. The method of claim 8, wherein the repository is hosted in a cloud computing platform.

11. The method of claim 8, wherein the first network device and the second network device comprise a network router the first configuration information and the second configuration information comprises a user profile, a user password, user preference setting, and a network router Service Set Identifier (SSID).

12. The method of claim 8, wherein the method comprises receiving the first configuration information, receiving the configuration request, and receiving the checkout request via a remote integrated application interface.

13. The method of claim 12, wherein the remote integrated application interface is accessed via a user login using a user login account.

14. The method of claim 13, wherein the configuration request is remotely generated automatically by the user login.

15. A non-transitory computer-readable storage medium comprising instructions which, when executed by a processor in a computer, cause the processor to:
  receive a first configuration information of a first network device;
  transmit the first configuration information to a repository for storage;
  receive a configuration request to automatically configure a second network device according to the first configuration information wherein the second network device is originally configured with a second configuration information;
  request and receive the second configuration information from the second network device;
  transmit the second configuration information to the repository for storage;
  retrieve the first configuration information from the repository;
  transmit the first configuration information to the second network device;
  automatically configure an operation of the second network device with the first configuration information; and
  upon receiving a checkout request during the operation of the second network device:
    retrieve the second configuration information from the repository;
    remove the first configuration information from the second network device; and
    automatically restore the configuration of the operation of the second network device with the second configuration information.

16. The non-transitory computer-readable storage medium of claim 15, wherein the instructions, when executed by the processor, cause the processor to transmit the first configuration information and second configuration information to the repository via a cloud connection.

17. The non-transitory computer-readable storage medium of claim 15, wherein the repository is hosted in a cloud computing platform.

18. The non-transitory computer-readable storage medium of claim 15, wherein the first network device and the second network device comprise a network router and the first configuration information and the second configuration information comprises a user profile, a user password, user preference setting, and a network router Service Set Identifier (SSID).

19. The non-transitory computer-readable storage medium of claim 15, wherein the instructions, when executed by the processor, cause the processor to receive the first configuration information, receive the configuration request, and receive the checkout request via a remote integrated application interface.

20. The non-transitory computer-readable storage medium of claim 19, wherein the remote integrated application interface is accessed via a user login using a user login account.

* * * * *